(12) United States Patent
Rosskopf et al.

(10) Patent No.: US 6,354,857 B1
(45) Date of Patent: Mar. 12, 2002

(54) TRANSMITTER HOUSING

(75) Inventors: Bernd Rosskopf, Schopfheim; Amir Vahid-Yousefnia, Denzlingen, both of (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/440,970

(22) Filed: Nov. 16, 1999

Related U.S. Application Data
(60) Provisional application No. 60/120,962, filed on Feb. 19, 1999.

(30) Foreign Application Priority Data
Dec. 11, 1998 (EP) .............................................. 98123660

(51) Int. Cl.⁷ .............................................. H01R 13/52
(52) U.S. Cl. .......................... 439/271; 439/936; 439/276
(58) Field of Search ................................ 439/271, 276, 439/936, 483

(56) References Cited
FOREIGN PATENT DOCUMENTS

| | | |
|---|---|---|
| DE | 29718245 | 11/1997 |
| EP | 585760 | 3/1994 |
| EP | 875736 | 11/1998 |
| FR | 2698492 | 5/1994 |
| WO | WO 96/06338 | 2/1996 |

*Primary Examiner*—P. Austin Bradley
*Assistant Examiner*—Briggitte Hammond
(74) *Attorney, Agent, or Firm*—Bose McKinney & Evans LLP

(57) ABSTRACT

A transmitter housing is provided in which the transmitter electronic unit is protected against ambient influences even during the electrical connection of the transmitter. The transmitter housing comprises a housing (1) for accommodating a transmitter electronic unit, and a connection housing (3), in which electrical connections that can be connected to external lines are provided and which is mechanically releasably connected to the housing (1). A plug-in connection (9) is provided between the housing (1) and the connection housing (3), via which plug-in connection the transmitter electronic unit can be connected to the connections.

6 Claims, 3 Drawing Sheets

TRANSMITTER HOUSING

This application claims benefit to Provisional Application No. 60/120,962 filed Feb. 19,1999

FIELD OF THE INVENTION

The invention relates to a transmitter housing.

BACKGROUND OF THE INVENTION

Transmitters are used in virtually all areas of measurement and control technology. There are a multiplicity of possible uses, both in stockkeeping and in processing industry, e.g. in the chemical industry, in the foodstuffs industry and in the oil industry.

Sensors, e.g. pressure, differential pressure, filling level and/or flow rate measurement sensors, are typically used, said sensors detecting a physical quantity and feeding a sensor signal proportional thereto to a transmitter. The sensor and transmitter are frequently combined in one apparatus comprising both the measurement sensor and the transmitter electronic unit. In the transmitter, the measurement signal is converted into a measurement signal which can be transmitted over relatively large distances. Often the sensor signal is additionally subjected to signal processing in the transmitter, said signal processing serving, e.g. to determine the desired measurement quantity, to eliminate or compensate for measurement errors and/or to improve the signal quality, e.g. by means of noise filters.

Cable lead-ins are regularly provided; external lines can be led into the transmitter through said cable lead-ins and the latter project beyond the transmitter housing. Conventional transmitter housings are in one piece and have a cover. When the cover has been opened, the lines led in through the cable lead-ins are accessible. The electrical connection of the transmitter, e.g. to a supply, to unidirectional signal lines and/or to bidirectional communications lines, is effected when the cover has been opened. In doing so, an electronic unit arranged in the housing is exposed to the influences of the surroundings without any protection. There is the risk, e.g. of moisture attacking the electronic unit and/or of the electronic unit being mechanically damaged. These risks are particularly high when transmitters are installed in the open, e.g. in the event of rain or snow, or when they are used in installations in which aggressive, abrasive or caustic materials are used or processed.

SUMMARY OF THE INVENTION

An object of the invention is to specify a transmitter housing in which the transmitter electronic unit is protected against ambient influences even during the electrical connection of the transmitter.

For this purpose, the invention consists in a transmitter housing having a housing for accommodating a transmitter electronic unit, and a connection housing,
  in which electrical connections that can be connected to external lines are provided and
  which is mechanically releasably connected to the housing,
  in which a plug-in connection is provided between the housing and the connection housing, via which plug-in connection the transmitter electronic unit can be connected to the connections.

In accordance with a further development of the invention, the transmitter can be addressed via a bus line, the bus lines pass through the connection housing, and branches from each bus line to the plug-in connection are provided in the connection housing.

In accordance with a preferred embodiment of the invention, a seal for protection of the plug-in connection is provided between the housing and the connection housing.

In accordance with a further preferred embodiment, a flame penetration barrier is provided on the housing.

In accordance with a further preferred embodiment, the connections are arranged inside the connection housing and the connection housing has an openable cover through which the connections are accessible.

In accordance with a further preferred embodiment, a cavity remaining in the connection housing is filled with a potting compound.

In accordance with a further preferred embodiment, the transmitter can be addressed via a bus line, the bus lines pass through the connection housing, and a bus driver circuit is arranged in the connection housing.

One advantage of the invention is that the housing together with the transmitter electronic unit can, as required, be exchanged without the transmitter having to be electrically connected anew. This can bring about considerable cost savings, e.g. in the context of exchanging defective apparatuses or during conversion to more modern transmitters.

Regular servicing of the transmitters is necessary in some cases. This is particularly laborious and costly when transmitters are used at poorly accessible locations or in harsh surroundings. In the case of the transmitter housing according to the invention, the housing together with the transmitter electronic unit can be separated from the connection housing in a simple manner and be serviced at a location which is better suited to this purpose.

BRIEF DESCRIPTION OF THE DRAWINGS

The invention and further advantages will now be explained in more detail with reference to the figures of the drawing, in which two exemplary embodiments are illustrated; identical elements are provided with the same reference symbols in the figures.

DETAILED DESCRIPTION OF EXEMPLARY EMBODIMENTS

Figure 1:
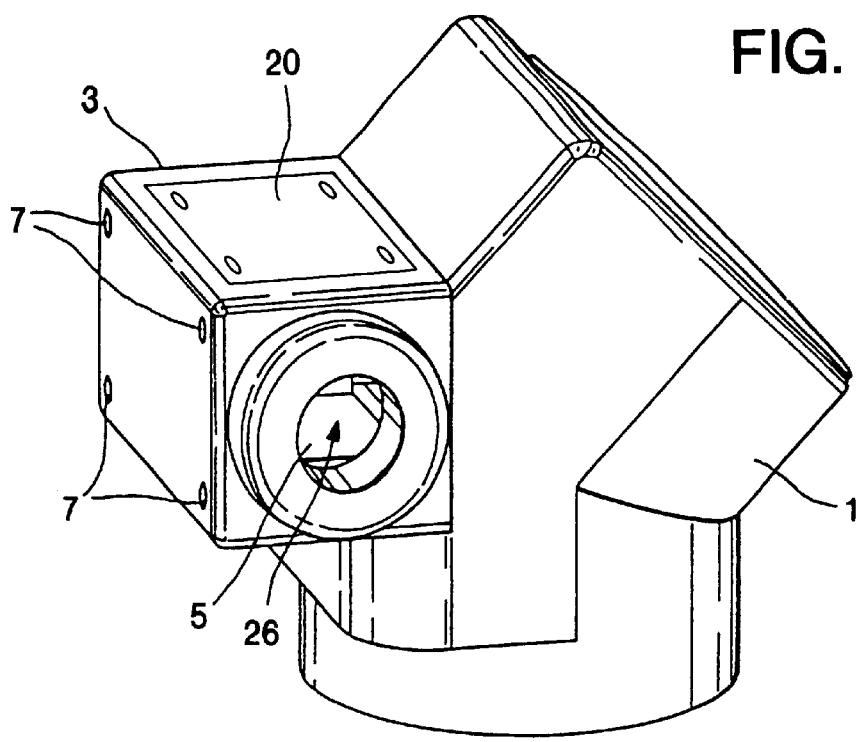
FIG. 1 shows a transmitter housing according to the invention.

FIG. 1 illustrates a transmitter housing for a transmitter. It has a housing 1 for accommodating a transmitter electronic unit (not illustrated in FIG. 1). The housing 1 is connected to a connection housing 3. The housing 1 and connection housing 3 together form the transmitter housing.

The connection housing 3 has openings 5, through which external lines 19 (see FIG. 5) can be passed into the connection housing 3. Examples of external lines 19 (see FIG. 5) are supply lines via which the transmitter can be connected to an external voltage supply, unidirectional communications lines, bidirectional communications lines and/or bus lines via which data, information, measured values, alarm signals, etc., can be transmitted in accordance with bus-specific transmission protocols, e.g. CAN bus, Fieldbus or Profibus transmission protocols. In addition, supply of the transmitter as well as communication can be effected via two conductors.

The housing 1 can be mechanically releasably connected to the connection housing 3. In the case of the exemplary embodiment illustrated in FIG. 1, the mechanical fastening is effected by means of screws 7, which are screwed through the connection housing 3 into the housing 1.

Figure 3:
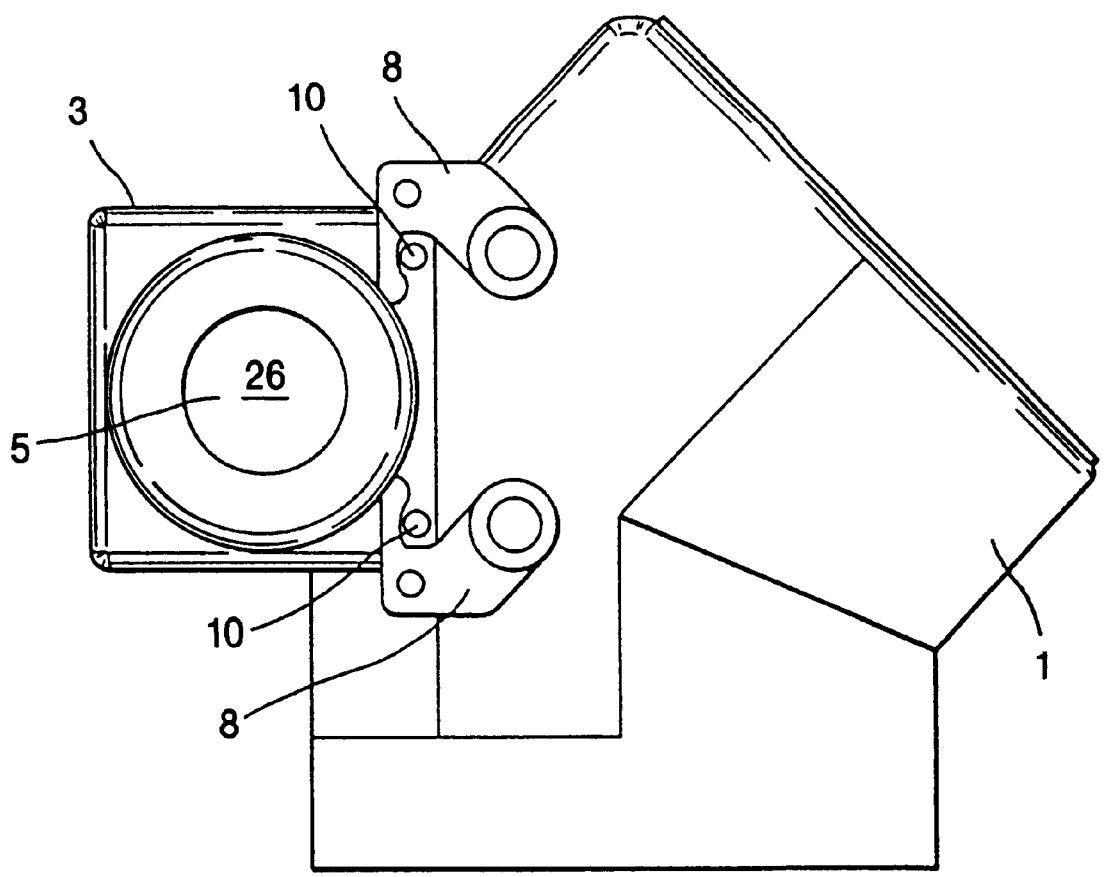
FIG. 3 shows a further transmitter housing, in which housing and connection housing are connected by means of clamping clips.

In the case of the exemplary embodiment illustrated in FIG. 3, the fastening is effected by means of clamping clips 8. The clamping clips 8 are fastened to the housing 1 such that they can pivot about an axle and each have a hook at their free end. Projecting lugs 10 are provided on the connection housing 3, behind which lugs the hooks engage in the assembled state, as illustrated in FIG. 3.

Other types of mechanical fastening can likewise be used. Thus, the mechanical connection can be effected by means of latching devices, for example.

Electrical connections that can be connected to the external lines 19 (see FIG. 5) are provided in the connection housing 3.

Two variants are possible for this purpose. On the one hand, the connection housing 3 may have an openable cover 20 through which the interior space of the connection housing 3 is accessible. When the cover has been opened, the external lines can then be connected to the electrical connections. On the other hand, the connection, when the housing 1 and connection housing 3 are separated from one another, can be effected through an opening in the connection housing 3, said opening facing the housing 1.

It is preferable for a cavity 26 remaining in the connection housing 3 to be filled with a potting compound. This potting compound affords protection against moisture which might otherwise penetrate the connection housing 3 and might pass through the connections and the plug-in connection 9 to the transmitter electronic unit. For this purpose, e.g. after the external lines have been electrically connected to the connections, potting compound is introduced in the liquid state through the cover or the opening into the connection housing 3, where it hardens.

A plug-in connection 9 is provided between the housing 1 and the connection housing 3, via which plug-in connection 9 the transmitter electronic unit can be connected to the connections. The plug-in connection 9 has a plug or male plug-in connection 9a and a socket of female plug-in connection 9b (see FIGS. 4 and 5). In this case, it is entirely unimportant whether the plug is arranged on the housing 1 and the socket is arranged on the connection housing 3, or vice versa. It will be assumed in the description below that the plug is arranged on the connection housing 3 and the socket is arranged on the housing 1.

In the housing 1, the transmitter electronic unit is electrically connected to one pole and/or a plurality of poles of the socket. In the connection housing 3, the individual connections are electrically connected to the corresponding poles of the plug.

Figure 2:
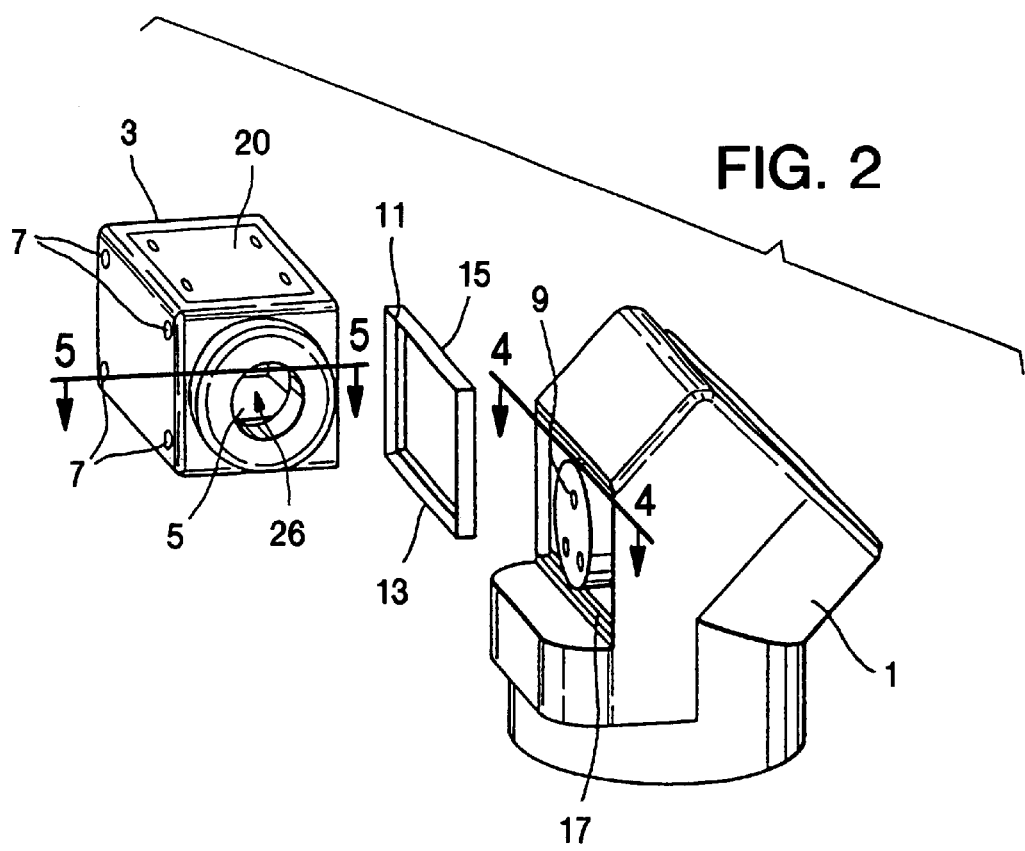
FIG. 2 shows individual parts of the transmitter housing of FIG. 1 in an exploded illustration.
Figure 5:
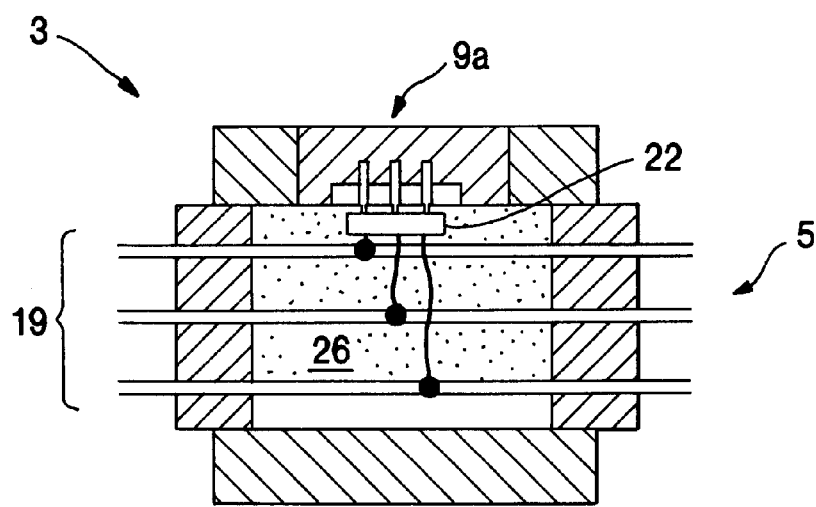
FIG. 5 show a cross-sectional view of the connection housing along line 5—5 of FIG. 2.

FIG. 5 shows a cross-sectional view of the connection housing 3 along line 5—5 of FIG. 2. As shown in FIG. 5, in the case of transmitters which can be addressed via bus lines, the bus lines preferably pass through the connection housing 3 and branches from each bus line to the plug-in connection 9 are provided in the connection housing 3. That affords the advantage that the housing 1 can be removed, e.g. for the purpose of servicing, without th e bus line thereby being interrupted. The function and operation of downstream apparatuses connected to the same bus lines are not disrupted or impaired at all. In particular, the user is spared the need to install a branch or bypass for the bus lines, this installation being necessary in the case of conventional transmitters.

A bus driver circuit 22 (see FIG. 5) is preferably provided in the connection housing 3. The transmitter communication via the bus takes place via the bus driver circuit 22. The bus bus driver circuit 22 may contain a DC isolation between transmitter and bus and amplify signals to be transmitted via further paths via the bus lines.

Referring again to FIG. 2, in order to protect the plug-in connection 9, a seal 11 is provided between the housing 1 and the connection housing 3. As illustrated in FIG. 2, this is, e.g. a shaped seal having a peripheral lip 13, which, for the purpose of prefixing, can be introduced into an identically shaped groove in the connection housing 3. When the housing 1 and connection housing 3 are mechanically connected to one another in the assembled state, an end face 15, opposite the lip 13, of the seal 11 bears on a shoulder area 17 in the housing 1. The seal 11 is clamped in between groove and shoulder area 17 by the mechanical fastening of the housing 1 and connection housing 3, that is to say by the screws 7 in the exemplary embodiment shown, and thereby seals off the interior space between the housing 1 and the connection housing 3 in which the plug-in connection 9 is situated.

Figure 4:
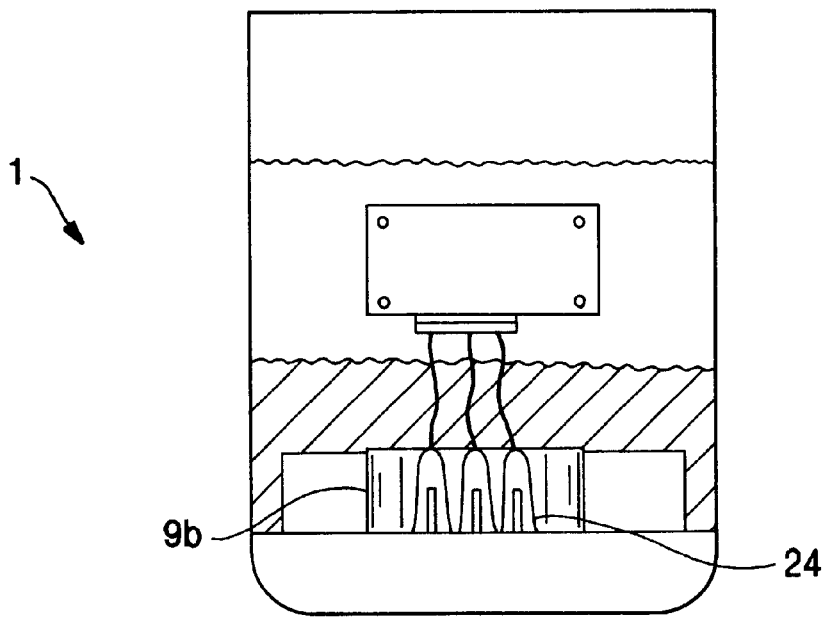
FIG. 4 shows a cross-sectional view of the transmitter housing along line 4—4 of FIG. 2.

FIG. 4 shows a cross-section view of the transmitter housing 1 along line 4—4 of FIG. 2. As shows in FIG. 4, a flame penetration barrier 24 is preferably provided in the housing 1. The flame penetration barrier 24 serves to prevent a spark occurring inside the housing 1 and/or a flame from penetrating to the outside. A flame penetration barrier is necessary, e.g. whenever the transmitter is used in areas where there is a risk of explosion. In such areas, even a small spark can lead to an explosion that may have disastrous consequences.

In most countries there are safety regulations which specify constructional regulations for flame penetration barriers, depending on the type of danger zone. An example of such a regulation is the German Standard DIN EN 50018 from 1994. It contains regulations for electrical operating equipment for areas where there is a risk of explosion with the class of protection: Explosion-proof enclosure. It includes, inter alia, constructional regulations for widths of joints, widths of gaps, threaded joints and seals.

As shown in FIG. 4 the flame penetration barrier may consist, e.g. in routing all the lines from the transmitter electronic unit through bushings which are arranged directly in front of the socket and are dimensioned in accordance with the abovementioned regulations. Equally, the socket 9b could be designed in accordance with these regulations, so that no spark and/or no flame can penetrate to the outside through the socket.

What is claimed is:

1. A transmitter housing, comprising:
   a housing configured to receive a transmitter electronic unit;
   a connection housing configured to provide an opening to receive at least one bus line;
   the connection housing including an electrical connector connected to a branch from each bus line;

a plug-in connection between the housing and the connection housing to connect the transmitter electronic unit to the electrical connector; and a releasable connection configured to connect the connection housing to the housing whereby the housing is removable from the electrical connector without interrupting the at least one bus line.

2. The transmitter housing as claimed in claim 1, in which a seal (11) for protection of the plug-in connection(9) is provided between the housing (1) and the connection housing (3).

3. The transmitter housing as claimed in claim 1, in which a flame penetration barrier is provided on the housing (1).

4. The transmitter housing as claimed in claim 1, in which connections are arranged inside the connection housing (3) and the connection housing (3) has an openable cover through which the connections are accessible.

5. The transmitter housing as claimed in claim 1, in which a cavity remaining in the connection housing is filled with a potting compound.

6. The transmitter housing as claimed in claim 1, in which the transmitter electronic unit can be addressed via the bus line, in which bus lines pass through the connection housing (3), and in which a bus driver circuit is arranged in the connection housing (3).

* * * * *

UNITED STATES PATENT AND TRADEMARK OFFICE
CERTIFICATE OF CORRECTION

PATENT NO.     : 6,354,857 B1                                    Page 1 of 1
DATED          : March 12, 2002
INVENTOR(S)    : Bernd Rosskopf and Amir Vahid-Yousefnia It is certified that error appears in the above-identified patent and that said Letters Patent is hereby corrected as shown below:

<u>Title page,</u>
Item [56], please add the following References Cited to the U.S. PATENT DOCUMENTS,

|  |  |  |
|---|---|---|
| -- 5,451,169 | 9/1995 | Corbett III, et al. |
| 5,447,445 | 9/1995 | Torii et al. |
| 5,179,343 | 1/1993 | Chishima et al. |
| 5,387,129 | 2/1995 | Hotea |
| 4,425,017 | 1/1984 | Chan |
| 4,491,290 | 1/1985 | Douglas -- |

Please add the following References Cited to the FOREIGN PATENT DOCUMENTS,

-- DE       8418488         9/27/84 --

Signed and Sealed this

Eighth Day of April, 2003

JAMES E. ROGAN
*Director of the United States Patent and Trademark Office*